United States Patent [19]
Okuda

[11] 3,939,494
[45] Feb. 17, 1976

[54] RESILIENT TAPE GUIDE ASSEMBLY FOR TAPE RECORDING AND/OR REPRODUCING APPARATUS
[75] Inventor: Shinji Okuda, Tokyo, Japan
[73] Assignee: Sony Corporation, Tokyo, Japan
[22] Filed: Feb. 20, 1974
[21] Appl. No.: 444,131

[30] Foreign Application Priority Data
Feb. 26, 1973 Japan.......................... 48-24320[U]

[52] U.S. Cl. .................... 360/84; 226/199; 360/130
[51] Int. Cl.² ......................................... G11B 15/60
[58] Field of Search ............... 360/84, 85, 128, 130; 226/199

[56] References Cited
UNITED STATES PATENTS

| | | | |
|---|---|---|---|
| 2,797,090 | 6/1957 | Tholstrup............................ | 226/199 |
| 3,123,272 | 3/1964 | Pollaschek......................... | 226/199 |
| 3,261,525 | 7/1966 | De Lange .......................... | 226/199 |
| 3,376,395 | 4/1968 | Rumple............................... | 360/84 |
| 3,592,976 | 7/1971 | McGinnis............................ | 360/130 |
| 3,643,849 | 2/1972 | Roberts............................... | 226/199 |
| 3,661,311 | 5/1972 | Warren............................... | 360/130 |
| 3,800,318 | 3/1974 | Jantzen................................ | 360/84 |

Primary Examiner—Bernard Konick
Assistant Examiner—David K. Moore
Attorney, Agent, or Firm—Lewis H. Eslinger; Alvin Sinderbrand

[57] ABSTRACT

A tape recording and/or reproducing apparatus of the type having a tape guide drum with a circumferential slot through which at least one rotary transducer projects for recording and/or reproducing signals on a tape running against the periphery of the drum in a path which extends about at least a portion of such periphery; is provided with a tape guide assembly which includes a rigid guide, for example, constituted by an axially facing shoulder on the drum, engageable by the lower longitudinal edge of the tape for establishing the direction and location of the tape path, and resilient guide elements mounted on the drum so as to act yieldably against the upper longitudinal edge of the tape for holding the latter against the rigid guide while accommodating variations and changes in the width of the tape. In disclosed embodiments, each of the resilient guide elements is constituted by a length of spring wire bent to a U-shaped configuration to provide an anchoring end portion adjustably secured in a respective first radial bore of the drum, a contact end portion engageable with the upper edge of the tape and being movable in a respective second radial bore of the drum, and an intermediate portion extending along the drum periphery between the anchoring and contact end portions.

6 Claims, 9 Drawing Figures

RESILIENT TAPE GUIDE ASSEMBLY FOR TAPE RECORDING AND/OR REPRODUCING APPARATUS

BACKGROUND OF THE INVENTION

1. Field of the Invention

This invention relates generally to tape recording and/or reproducing apparatus of the type in which, during recording and reproducing operations, the tape runs about at least a portion of the periphery of a tape guide drum having a circumferential slot through which at least one rotary transducer or magnetic head projects for recording and/or reproducing signals on the tape, and the invention is more particularly directed to an improved guide assembly for establishing the path of the tape on the tape guide drum.

2. Description of the Prior Art

In existing apparatus of the above described type, for example, in existing video tape recorders, the tape guide drum is usually composed of upper and lower drum sections which are mounted on a chassis with a small gap between the drum sections to define the circumferential slot, and the recording medium, such as, a magnetic tape, is guided to and from the periphery of the tape guide drum so as to extend helically about at least a portion of the periphery where the tape covers the circumferential slot. Further, two rotary transducers or magnetic heads are mounted on the opposite ends of a rotary support arm within the drum so as to project through the circumferential slot into contact with the tape engaging the periphery of the guide drum so that, in response to rotation of the magnetic heads and advancement or running of the tape, the heads alternately scan sucessive record tracks which extend obliquely across the tape for either recording or reproducing signals in such record tracks.

Since the tape runs helically on the periphery of the tape guide drum, accurate tracking or scanning of the oblique record tracks by the rotary magnetic heads or transducers requires that the path of the tape on the guide drum be precisely maintained. If the tape on the drum deviates from the predetermined path during either recording or reproducing operations, the quality of the video or other signals reproduced from the tape is deteriorated. Usually, the helical path of the tape on the periphery of the guide drum is established by an upwardly facing, inclined shoulder projecting from the periphery of the lower drum section so as to be engageable by the lower longitudinal edge of the tape. Such upwardly facing, inclined shoulder may be defined by a radially enlarged portion of the lower drum section, or by an arcuate strip secured to, and extending along the periphery of the lower drum section. Since the width of the tape is not precisely uniform, the positioning of the lower edge of the tape has been adopted as the standard for establishing the desired helical path of the tape on the guide drum and obtaining compatibility of various tapes and various recording and/or reproducing apparatus. Of course, when the desired helical tape path is established by engagement of the lower longitudinal edge of the tape with the upwardly facing, inclined shoulder on the lower drum section, the precise positioning of the tape in the desired helical path is achieved only so long as the lower longitudinal edge of the tape is in contact with the shoulder along the full length of the latter. However, during recording and reproducing operations, the tape extending helically about the guide drum may have a tendency to move away from the guiding shoulder, for example, by reason of tension in the tape, with the result that the tape deviates from the desired path.

In order to hold the lower longitudinal edge of the tape against the upwardly facing, inclined guide shoulder on the lower drum section, it has been proposed to employ a downwardly tapering drum section so that tension in the tape will result in forces urging the tape downwardly against the guide shoulder. However, providing the peripheral surface of the upper drum section with such taper and assembling the upper and lower drum sections in the necessary precise relationship to each other are difficult and time consuming operations. Further, in tape recording and/or reproducing apparatus of the described type, horizontal runs of the tape extending to and away from the helical path of the tape on the guide drum are guided by respective tapered guide pins or rollers mounted on the chassis adjacent the guide drum and, in the case where the upper drum section is tapered for urging the tape downwardly against the upwardly facing, inclined guide shoulder, as aforesaid, the tapered guide pins or rollers have to be precisely adjusted so as to permit the tapered upper drum section to achieve the desired effect. Thus, the use of a tapered upper drum section for maintaining the tape in contact with the upwardly facing, inclined guide shoulder involves precise and time consuming adjustments in order to obtain acceptable video or other information signals.

In U.S. Pat. No. 3,261,525, it is proposed to guide the tape on the guide drum by means of rigid studs which are adjustably mounted at spaced apart locations on the upper and lower guide drum sections so as to be engageable with the upper and lower longitudinal edges of the tape running about the guide drum. In order to define the desired helical path of the tape on the guide drum, it is necessary to precisely adjust the several guide studs on the upper and lower drum sections. Apart from the time and effort involved in effecting such precise adjustments of the several guide studs, the arrangement disclosed in this patent is disadvantageous in that the engagement of both the upper and lower longitudinal edges of the tape by the rigid guide studs does not provide accommodation for the variations in the width of the tape which cannot be eliminated in the practical manufacture of the tape. Thus, if the tape being employed has a width slightly less than that for which the rigid guide studs have been adjusted on the upper and lower drum sections, then the tape is free to drift laterally between the guide studs and will not follow a precise helical path. On the other hand, if the width of the tape being employed exceeds that for which the rigid guide studs have been adjusted, then the tape will buckle or have its edges damaged by reason of the engagement of both longitudinal edges of the tape with the rigid guide studs.

SUMMARY OF THE INVENTION

Accordingly, it is an object of this invention to provide a tape recording and/or reproducing apparatus, as aforesaid, with a guide assembly for maintaining the tape in a precisely predetermined helical path on the tape guide drum while avoiding the previously mentioned disadvantages of the prior art.

More particularly, it is an object of this invention to provide a tape recording and/or reproducing apparatus, as aforesaid, in which the tape is reliably maintained in a predetermined helical path on the tape guide drum without the necessity of effecting precise adjustments of any of the guiding elements, and while permitting the use of upper and lower guide drum sections which both have easily produced cylindrical surfaces.

Another object is to provide a tape recording and/or reproducing apparatus, as aforesaid, in which the tape is reliably maintained in a precisely predetermined helical path on the tape guide drum and damage to the tape is avoided, notwithstanding variations in the width of the tape.

In accordance with an aspect of this invention, a tape recording and/or reproducing apparatus having a tape guide drum with a circumferential slot and at least one rotary transducer or magnetic head projecting through the slot for recording and/or reproducing signals on a tape running against the periphery of the drum in a path which extends about at least a portion of such periphery, is provided with a guide assembly for the tape on the drum which comprises rigid guide means, for example, constituted by an upwardly facing shoulder on a lower section of the drum, engageable by one longitudinal edge of the tape for establishing the direction and location of the tape path, and resilient guide means acting yieldably against the other longitudinal edge of the tape in such path for holding the tape in contact with the rigid guide means while accommodating variations and changes in the width of the tape.

In a particular embodiment of this invention, the resilient guide means includes a plurality of resilient guide elements spaced apart along the path of the tape on the guide drum, with each of the resilient guide elements, which may be formed of spring wire, including an achoring end portion fixed relative to the drum, a contact end portion engageable against the respective longitudinal edge of the tape and an intermediate portion extending along the periphery of the drum from the anchoring end portion to the contact end portion of the respective resilient guide element and being inclined toward the tape path.

The above, and other objects, features and advantages of the invention, will be apparent in the following detailed description of illustrative embodiments thereof which is to be read in connection with the accompanying drawings.

DESCRIPTION OF PREFERRED EMBODIMENTS

Figure 1:
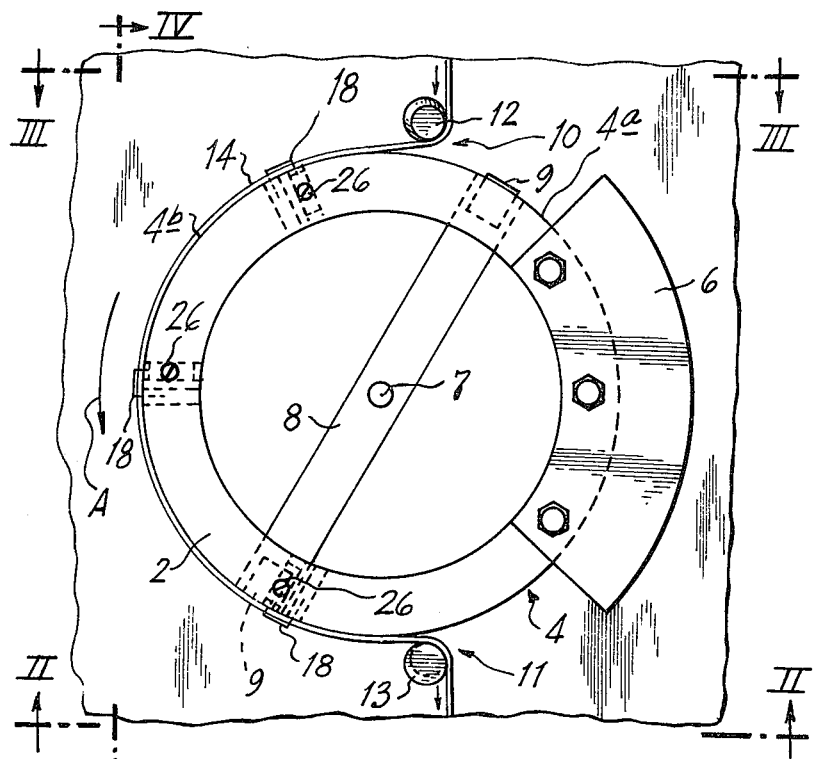
FIG. 1 is a fragmentary top plan view of a portion of a tape recording and/or reproducing apparatus showing the tape guide drum thereof provided with a guide assembly for the tape in accordance with an embodiment of the present invention.
Figure 2:
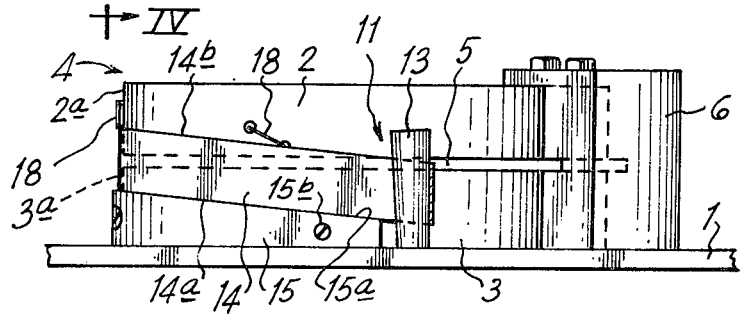
FIGS. 2 and 3 are opposite side elevational views of the structure shown on FIG. 1 as viewed in the directions of the arrows II—II and III—III, respectively, on FIG. 1.
Figure 3:
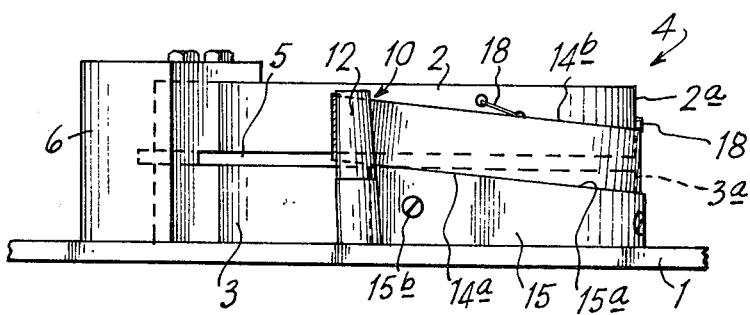

Referring initially to FIGS. 1–4, it will be seen that a tape recording and/or reproducing apparatus, for example, a video tape recorder, of the type to which the present invention is applied generally comprises a chassis 1 on which there is mounted a tape guide drum 4 made up of upper and lower drum sections 2 and 3. The drum sections 2 and 3 are mounted so as to provide a circumferential slot or gap 5 therebetween, for example, lower drum section 3 may be secured on chassis 1, and upper drum section 2 may be supported above lower drum section 3 in spaced relation to the latter by means of a support bracket 6 located at the back or one side 4a of tape guide drum 4. A rotatable shaft 7 projects upwardly from chassis 1 into drum 4 coaxially with the latter, and a support arm 8 is secured, at its center, on shaft 7 for rotation with the later. Transducers, for example, magnetic heads 9, are mounted on the opposite ends of support arm 8 and project outwardly through circumferential slot or gap 5.

Figure 4:
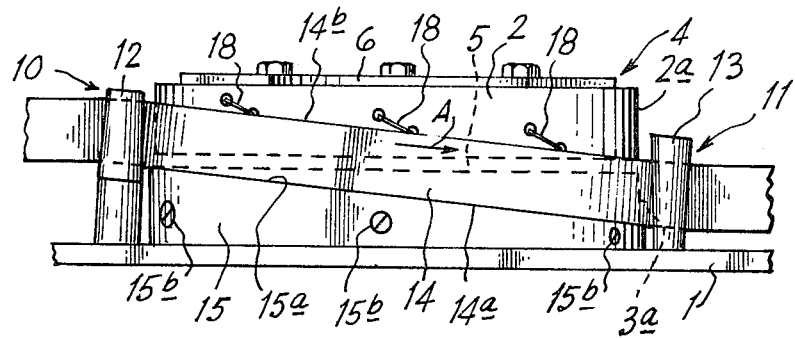
FIG. 4 is a front elevational view of the structure shown on FIG. 1 as viewed in the direction of the arrows IV—IV.

Also mounted on chassis 1 at substantially diametrically opposed locations 10 and 11 adjacent the periphery of tape guide drum 4 are guide pins or rollers 12 and 13, respectively, by which a magnetic tape 14 is guided to and away from the periphery of guide drum 4 so that, between guide pins or rollers 12 and 13, tape 14 runs against the periphery of drum 4 in a path which extends about at least the portion 4b of the drum periphery facing away from bracket 6. As shown particularly on FIGS. 2, 3 and 4, guide pin or roller 12 at location 10 is tapered upwardly and arranged at a relatively high level, while guide pin or roller 13 at location 11 is tapered downwardly and arranged at a relatively low level. By reason of the foregoing arrangement of guide pins or rollers 12 and 13, the tape 14 may be made to approach guide drum 4 in a relatively high horizontal run and to leave guide drum 4 in a relatively low horizontal run, with the tape between guide pins or rollers 12 and 13 running against the portion 4b of the drum periphery in a helical or inclined path so as to cover the slot or gap 5 (FIG. 4). Thus, when during a recording or reproducing operation of the illustrated apparatus tape 14 is advanced or made to run in the direction of the arrow A (FIGS. 1, 4 and 6) and shaft 7 is rotated, for example, at a speed of 30 r.p.s., the opposed magnetic heads 9 on support arm 8 alternately scan successive record tracks which extend obliquely across the tape for either recording or reproducing video or other information signals in such record tracks.

Since the tape runs helically on the portion 4b of the drum periphery, accurate tracking or scanning of the oblique record tracks by the rotary magnetic heads or transducers 9 requires that the path of tape 14 on guide drum 4 be precisely maintained. If the tape on guide drum 4 deviates from a predetermined helical path during either recording or reproducing operations, the quality of the video or other information signals reproduced from the tape is deteriorated.

As is usual, the helical path of tape 14 on the portion 4b of the drum periphery is established by an upwardly facing, inclined guide shoulder 15a projecting from the periphery of lower drum section 3 so as to be engageable by the lower longitudinal edge 14a of tape 14. Such upwardly facing, inclined guide shoulder 15a may be defined by a radially enlarged portion formed integrally with lower drum section 3, or by an arcuate strip or band 15 having an inclined upper edge to define the shoulder 15a and extending along the periphery of lower drum section 3 to which strip or band 15 is secured, for example, as by screws 15b. Thus, shoulder 15a provides a rigid guide to establish a predetermined helical path for the tape 14 on drum 4 so long as the lower longitudinal edge 14a of the tape remains in contact with shoulder 15a along the length of the latter.

Figure 5:
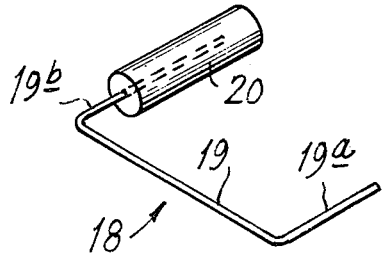
FIG. 5 is an enlarged perspective view of one of the resilient guide elements employed in the guide assembly shown on FIGS. 1-4.

In accordance with the present invention, lower longitudinal edge 14a of tape 14 is held against upwardly facing, inclined guide shoulder 15a by resilient guide means acting yieldably in the downward direction against the upper longitudinal edge 14b of tape 14. More particularly, such resilient guide means is shown to include a plurality of resilient guide elements 18 which are spaced apart along the portion 4b of the guide drum periphery. In the illustrated embodiment, in which portion 4b of the guide drum periphery engaged by tape 14 extends about approximately one-half of guide drum 4, three resilient guide elements 18 are provided and are spaced substantially equally from each other and from guide pins or rollers 12 and 13. As shown particularly on FIG. 5, each of the resilient guide elements 18 may be formed of a length of wire of non-magnetic and resilient material, such as, stainless steel, which is bent into a generally U-shaped configuration so as to include an intermediate portion 19 extending between a contact end portion 19a and an anchoring end portion 19b which is fixedly embedded in a cylindrical holder 20 of a rigid synthetic resin.

Figure 6:
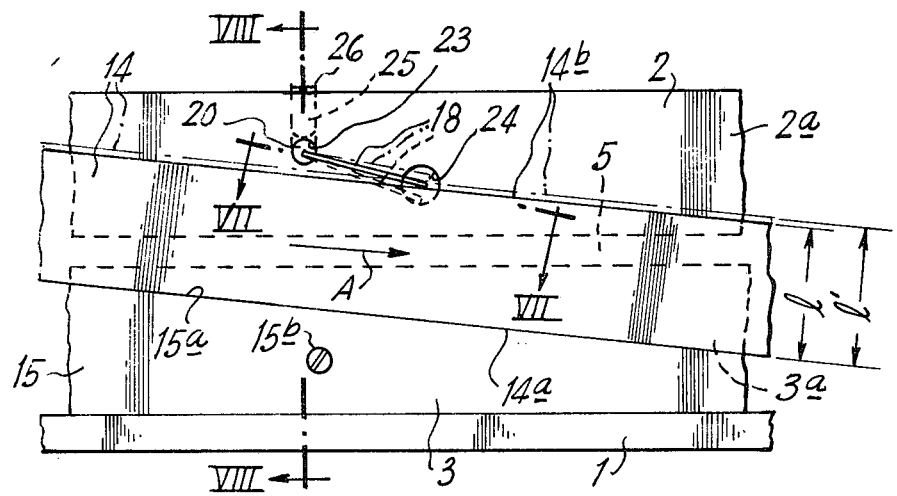
FIG. 6 is an enlarged, fragmentary elevational view illustrating the manner in which the guide assembly according to this invention is effective to maintain the tape in a precisely predetermined helical path on the tape guide drum, notwithstanding variations in the width of the tape.
Figure 7:
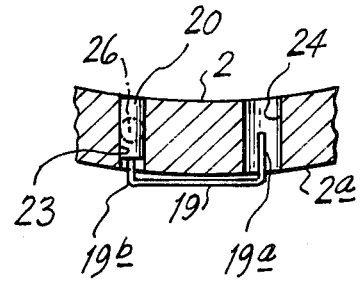
FIG. 7 is a detail sectional view taken along the line VII—VII on FIG. 6.
Figure 8:
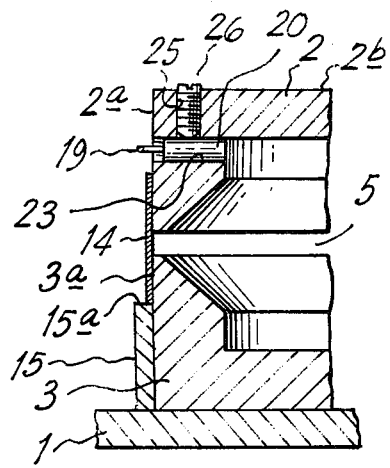
FIG. 8 is a detail sectional view taken along the line VIII—VIII on FIG. 6.

In order to mount each of the resilient guide elements 18 on tape guide drum 4, the upper drum section 2 is provided with first and second radial bores 23 and 24, respectively, opening at the peripheral surface 2a of drum section 2 for each of resilient guide elements 18 (FIGS. 6–8). Each first radial bore 23 is located axially on upper drum section 2 so as to be disposed well above the upper longitudinal edge 14b of tape 14 when the latter has its lower longitudinal edge 14a guided helically on drum 4 by inclined guide shoulder 15a, and each first bore 23 is diametrically dimensioned to slidably receive holder 20 of the respective resilient guide element 18. Each second radial bore 24 is spaced along periphery 2a of upper drum section 2 from the respective bore 23 preferably in the direction of running of tape 14, as indicated by the arrow A on FIG. 6, and is axially located on drum section 2 below the respective bore 23 so that the opening of bore 24 is partly covered by the upper edge portion of tape 14 and partly exposed above upper longitudinal edge 14b, as shown. The spacing between bores 23 and 24 is selected so that, with holder 20 of the respective resilient guide element 18 received in bore 23, contact end portion 19a of the resilient guide element extends into the respective bore 24 which is diametrically dimensioned to permit substantial swinging movement of contact end portion 19a therein about an axis constituted by anchoring end portion 19b. In order to adjustably lock anchoring end portion 19b of each resilient guide element 18 in the respective bore 23, upper drum section 2 further has a vertical tapped bore 25 extending from its upper surface into each first radial bore 23 and receiving a set screw 26 by which the respective holder 20 is secured in bore 23.

The resilient guide elements 18 are initially adjusted so that, with tape 14 absent from tape guide drum 4, the contact end portion 19a of each resilient guide element will be disposed below the eventual position of the upper longitudinal edge 14b of the tape, for example, so that the contact end portion 19a of each resilient guide element 18 bears against the bottom of the respective bore 24 as shown in broken lines on FIG. 6. Thereafter, when tape 14 is wrapped about guide drum 4 in the helical path determined by the engagement of lower longitudinal edge 14a of the tape against inclined shoulder 15a of the rigid guide, the contact end portion 19a of each resilient guide element 18 is engaged with the upper longitudinal edge 14b of the tape and raised thereby from its original position, for example, to the position shown in full lines on FIG. 6. Such raising of each contact end portion 19a causes torsional flexing of the respective anchoring end portion 19b and longitudinal flexing or bending of the respective intermediate portion 19. Thus, each contact end portion 19a acts yieldably downward against upper longitudinal edge 14b of tape 14 for holding the lower longitudinal edge 14a of the tape in contact with the fixed guide shoulder 15a. The force thus applied by each resilient guide element 18 to the upper longitudinal edge 14b of the tape is preferably relatively small, for example, in the range from about 2 to 5 grams, so as to avoid damage to the tape while ensuring that the lower longitudinal edge 14a of the tape will be reliably maintained in contact with guide shoulder 15a to cause tape 14 to follow the predetermined helical path on tape guide drum 4. It has been found that, when resilient guide elements 18 are constructed in accordance with the embodiment of the invention shown on FIG. 5, the indicated small resilient force for holding tape 14 in contact with guide shoulder 15a while avoiding damage to the tape can be obtained if each resilient guide element 18 is formed of a length of stainless steel spring wire having a diameter of approximately 0.2 mm.

Further, in order to avoid damage to tape 14 while the upper longitudinal edge thereof is acted upon by contact end portion 19a of each resilient guide element 18, each bore 23 receiving holder 20 on anchoring end portion 19b of the respective resilient guide element is vertically located so that the intermediate portion 19a of the resilient guide element will be inclined downwardly toward the path of the tape preferably in the running direction A of the tape, as clearly shown on FIG. 6.

Figure 9:
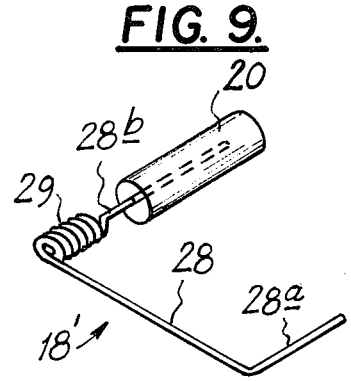
FIG. 9 is a perspective view similar to that of FIG. 5, but showing a resilient guide element in accordance with another embodiment of this invention.

Referring now to FIG. 9, it will be seen that, in accordance with another embodiment of this invention, each of the resilient guide elements 18' may be formed of a length of resilient or spring wire which is bent so as to have a generally U-shaped configuration for providing a contact end portion 28a, an anchoring end portion 28b embedded in a rigid synthetic resin holder 20, and an intermediate portion 28 extending between end portions 28a and 28b and being joined to the anchoring end portion 28b by means of a helical coil 29 which is coaxial with end portion 28b. It will be apparent that each of the resilient guide elements 18' is mounted on upper drum section 2 in the manner described above with reference to guide elements 18 so that the contact end portion 28a of each resilient guide element 18' will act yieldably against the upper longitudinal edge of tape 14 for holding the latter against the fixed guide shoulder 15a. However, in the case of each resilient guide element 18', yieldable movement of its contact end portion 28a is accompanied primarily by flexing of the coil 29, that is, by loosening or tightening of its turns, so that the desired small force of approximately 2 to 5 grams can be applied to the upper longitudinal edge of tape 14 by resilient guide elements 18' formed of relatively thicker stainless steel spring wire, for example, wire having a diameter of 0.35 to 0.45 mm.

It will be noted that the resilient guide elements 18 or 18' are effective to hold lower longitudinal edge 14a of tape 14 in contact with fixed guide shoulder 15a for ensuring that the tape will move in a precisely predetermined helical path on guide drum 4, as previously described, while accommodating variations and changes in the width of the tape. Thus, if the width of the tape changes from the dimension $l$ to the dimension $l'$ shown on FIG. 6, each of resilient guide elements 18 is merely shifted to the position shown in dot-dash lines on FIG. 6 so as to continue to exert the desired small yieldable force on the upper longitudinal edge of the tape for holding the lower longitudinal edge 14a against fixed guide shoulder 15a without damage to the tape.

Although illustrative embodiments of the invention have been described in detail herein with reference to the accompanying drawings, it is to be understood that the invention is not limited to those precise embodiments, and that various changes and modifications may be effected therein without departing from the scope or spirit of the invention as defined in the appended claims. For example, the fixed guide shoulder 15a defined by the strip 15 or radially raised portion of lower drum section 3 may be replaced by a plurality of suitably located fixed guide pins extending from the peripheral surface 3a of the lower drum section; the number and spacing of the resilient guide elements 18 or 18' may be varied from those shown on the drawings; and the resilient guide elements 18 or 18' may be formed of a suitably resilient synthetic resin rather than of spring wire, as described. Further, the positions of the rigid guide and the resilient guide elements relative to tape 14 may be reversed, that is, the fixed guide shoulder 15a may be engageable with the upper longitudinal edge of tape 14 while the resilient guide elements 18 or 18' act upwardly against the lower longitudinal edge of the tape; and the path of tape 14 on guide drum 4 may be varied from that shown on the drawings, for example, the tape 14 may be fed to the surface of guide drum 4 at location 10 at a relatively low level and be led away from the peripheral surface of guide drum 4 at location 11 at a relatively high level.

What is claimed is:

1. In a tape recording and/or reproducing apparatus having a tape guide drum with a circumferential slot, and at least one rotary transducer projecting through said slot for recording and/or reproducing signals on a tape running against the periphery of said drum in a path which extends about at least a portion of said periphery; a guide assembly for the tape on said drum comprising rigid guide means extending along said portion of the drum periphery and engageable by one longitudinal edge of the tape in said path for establishing the direction and location of said path, and a plurality of resilient elongated guide elements spaced apart along said portion of the drum periphery and having respective contact end portions individually acting yieldably against the other longitudinal edge of the tape at apaced apart locations along the latter in said path for holding the tape in contact with said rigid guide means while accommodating variations and changes in the width of said tape, each of said resilient guide elements including an anchoring end portion fixed relative to said drum, and an intermediate portion extending along the periphery of said drum from said anchoring end portion to said contact end portion and being inclined toward said path with said contact end portion being resiliently swingable about an axis defined by said anchoring end portion.

2. A tape recording and/or reproducing apparatus according to claim 1; in which said intermediate portion of each of said resilient guide elements extends generally in the direction of running of the tape in said path.

3. In a tape recording and/or reproducing apparatus having a tape guide drum with a circumferential slot, and at least one rotary transducer projecting through said slot for recording and/or reproducing signals on a tape running against the periphery of said drum in a path which extends about at least a portion of said periphery; a guide assembly for the tape on said drum comprising rigid guide means extending along said portion of the drum periphery and engageable by one longitudinal edge of the tape in said path for establishing the direction and location of said path, and a plurality of resilient guide elements spaced apart along said portion of the drum periphery and individually acting yieldably against the other longitudinal edge of the tape in said path for holding the tape in contact with said rigid guide means while accommodating variations and changes in the width of said tape, each of said resilient guide elements including an anchoring end portion fixed relative to said drum, a contact end portion engageable against said other longitudinal edge of the tape and an intermediate portion extending along the periphery of said drum from said anchoring end portion to said contact end portion and being inclined toward said path with said contact end portion being resiliently swingable about an axis defined by said anchoring end portion, and in which said drum has first and second radial bores for each of said resilient guide elements, said first and second radial bores open at said periphery of the drum at locations spaced apart along said periphery, and each of said resilient guide elements is generally U-shaped and has its anchoring end portion and contact end portion respectively fixed and movable within the associated first and second bores.

4. A tape recording and/or reproducing apparatus according to claim 3; in which said anchoring end portion of each said resilient guide element is adjustably turnable in the respective first bore, and means are provided to lock said anchoring end portion against turning in said respective first bore.

5. A tape recording and/or reproducing apparatus according to claim 3; in which each said generally U-shaped resilient guide element is formed of a length of spring wire.

6. A tape recording and/or reproducing apparatus according to claim 5; in which said anchoring end portion of each said resilient guide element includes a coil section.

* * * * *